UNITED STATES PATENT OFFICE.

PATRICK J. MURPHY, OF PAWTUCKET, RHODE ISLAND.

COVERING FOR STEAM-PIPES.

SPECIFICATION forming part of Letters Patent No. 350,941, dated October 19, 1886.

Application filed July 26, 1886. Serial No. 209,159. (Model.)

*To all whom it may concern:*

Be it known that I, PATRICK J. MURPHY, a citizen of the United States, residing at Pawtucket, in the county of Providence and State of Rhode Island, have invented a new and useful Composition of Matter to be Used for Covering Steam-Pipes to Prevent the Radiation of Heat therefrom, of which the following is a specification.

My said composition of matter consists of the following ingredients, combined in the manner stated, viz: first, sifted ashes from wood or coal, and from which all substances foreign thereto have been separated; second, ordinary glucose; third, water. These ingredients are to be mixed together in the proportions hereinafter stated, with such variations therefrom, as described, as may be required by the circumstances under which the composition may be used—viz., one pound of glucose to one bushel of fine sifted ashes, thoroughly mixed or stirred together, with sufficient water to make the composition of the consistency required. These proportions will be suitable for ordinary use; but the quantity of glucose may be increased or diminished relatively to the measure of sifted ashes used, as above stated, as the places within which the pipes to be coated are situated or the circumstances under which the composition is to be applied may render it necessary.

The application of this composition to steam-pipes may be made by suitable brushes or by a trowel or other appropriate tool. It should be applied in layers, say, of one-quarter inch in thickness, and each layer allowed to dry or harden before the next is applied. These layers may be continuously increased in number until the sheathing of the pipes thereby obtained has become as thick as desired. This covering for steam-pipes, so prepared and applied as aforesaid, will prove a most perfect non-conductor of heat, and with common care will last for many years. Its constituent parts are cheap and easily combined, and the composition may be easily applied to any pipes by any ordinary workman.

I am aware that a covering for steam-pipes has heretofore been made of glue, ashes, fiber, sawdust, plaster-of-paris, and air-slaked lime; but a compound formed of these elements is objectionable, owing to its brittleness, caused by the presence of the quickly drying and hardening agents, the plaster-of-paris and the lime. I depend on no drying and hardening agents; neither are such desirable, for by mixing just sufficient glucose with the bulk of ashes to form a plastic mass and then adding just enough water to bring the mass to a proper consistency for application I produce a compound which will dry in a reasonably short time, and which, when dry, will be tough and tenacious.

I claim as new and desire to secure by Letters Patent—

The herein-described composition of matter to be used for covering steam-pipes to prevent the radiation of heat therefrom, consisting of water, glucose, and fine sifted ashes, in the proportions and compounded and applied substantially as hereinbefore specified.

PATRICK J. MURPHY.

Witnesses:
THOS. P. BARNEFIELD,
JOSEPH H. PAINE.